(12) United States Patent
Burles

(10) Patent No.: US 8,646,731 B2
(45) Date of Patent: Feb. 11, 2014

(54) WORKPIECE SUPPORT ASSEMBLY

(76) Inventor: Grant Burles, Calgary (CA)

(*) Notice: Subject to any disclaimer, the term of this patent is extended or adjusted under 35 U.S.C. 154(b) by 258 days.

(21) Appl. No.: 13/096,070

(22) Filed: Apr. 28, 2011

(65) Prior Publication Data
US 2012/0273625 A1 Nov. 1, 2012

(51) Int. Cl.
*F16L 3/00* (2006.01)
(52) U.S. Cl.
USPC ............... 248/49; 248/55; 248/161; 269/296; 193/37; 144/287
(58) Field of Classification Search
USPC ............. 248/55, 132, 146, 161, 163.1, 176.1, 248/49, 70, 65; 269/296, 57, 58; 193/37; 144/287; 414/682, 680, 684, 800
See application file for complete search history.

(56) References Cited

U.S. PATENT DOCUMENTS

| | | | | |
|---|---|---|---|---|
| 977,987 A * | 12/1910 | Willson, Jr. | ................... | 198/826 |
| 1,097,273 A * | 5/1914 | Tyler | ................. | 248/55 |
| 1,891,995 A * | 12/1932 | Marcy | ............... | 248/55 |
| 1,970,840 A * | 8/1934 | Cardwell et al. | ................ | 248/55 |
| 2,189,716 A * | 2/1940 | Kash | ................ | 414/684 |
| 2,216,504 A * | 10/1940 | Sekulski | ..................... | 193/35 B |
| 2,236,029 A * | 3/1941 | Eggleston | ................... | 193/35 B |
| 2,376,238 A * | 5/1945 | Dixon | ........................... | 248/351 |
| 2,405,810 A * | 8/1946 | Berg et al. | ........................ | 193/42 |
| 2,517,112 A * | 8/1950 | Jones | ................ | 193/42 |
| 2,653,347 A * | 9/1953 | Diekman | .................... | 452/194 |
| 2,706,609 A * | 4/1955 | Sullivan | ........................ | 248/167 |
| 2,733,330 A * | 1/1956 | Blewett | .......................... | 219/158 |
| 2,893,669 A * | 7/1959 | Kindorf | ........................... | 248/55 |
| 3,554,475 A * | 1/1971 | Benno | .............................. | 248/55 |
| 3,602,492 A | 8/1971 | Petrie | | |
| 3,735,973 A | 5/1973 | Petrie | | |
| 3,741,509 A | 6/1973 | Kelly | | |
| 4,492,354 A * | 1/1985 | Rice | ........................... | 248/163.1 |
| 4,502,653 A * | 3/1985 | Curtis, Jr. | ......................... | 248/55 |
| 4,520,981 A * | 6/1985 | Harrigan | ........................ | 248/413 |
| 4,790,428 A * | 12/1988 | Ramsey | ........................ | 198/840 |
| 5,165,665 A | 11/1992 | Jolivette, Sr. | | |
| 5,280,891 A | 1/1994 | Estes | | |
| 5,299,656 A * | 4/1994 | Grill | .......................... | 182/186.4 |
| 5,337,875 A * | 8/1994 | Lee | ................. | 193/35 R |
| 5,341,920 A * | 8/1994 | Riffe | .............................. | 198/825 |
| 5,435,411 A * | 7/1995 | Borgatti | ..................... | 182/181.1 |
| 5,441,091 A * | 8/1995 | Collins | ......................... | 144/287 |
| 5,658,124 A * | 8/1997 | Presnell, III | .................. | 414/800 |

(Continued)

OTHER PUBLICATIONS

Javelin Industrial, *Javelin Pipe Rollers*, http://www.javelinindustrial.com/javelin-pipe-rollers.html (accessed Apr. 18, 2011).

*Primary Examiner* — Kimberly Wood
(74) *Attorney, Agent, or Firm* — Maxey Law Offices, PLLC; Stephen Lewellyn

(57) ABSTRACT

A workpiece support assembly includes workpiece supporting roller assemblies each including a roller rotatably attached to an end of a swing arm. The roller assemblies are mounted to a frame forming a space between the rollers. A workpiece is positioned within the space and is supported in rolling contact by the rollers for rotation about its long axis. The space between the rollers is increased or decreased to support workpieces of various diameters by rotating the swing arms. The position of the rollers, and thus the distance therebetween are maintained or held by a swing arm lock that engages each swing arm and restrains the swing arms against rotation.

5 Claims, 3 Drawing Sheets

(56) References Cited

U.S. PATENT DOCUMENTS

| | | | | |
|---|---|---|---|---|
| 5,768,830 | A | * | 6/1998 | Kelly .......................... 52/127.1 |
| 5,934,626 | A | * | 8/1999 | Collins, Jr. ..................... 248/132 |
| 6,179,024 | B1 | * | 1/2001 | Yang ............................ 144/287 |
| 6,179,116 | B1 | * | 1/2001 | Noniewicz et al. ........... 198/632 |
| 6,279,717 | B1 | * | 8/2001 | Chen ....................... 193/35 MD |
| 6,575,213 | B1 | * | 6/2003 | Houk ........................... 144/287 |
| 6,758,449 | B1 | * | 7/2004 | Chen et al. .................... 248/146 |
| 6,988,719 | B2 | | 1/2006 | Ursell et al. |
| 7,182,302 | B2 | * | 2/2007 | Noniewicz .................... 248/164 |
| 7,784,749 | B2 | * | 8/2010 | Radermacher ................ 248/161 |
| 7,832,692 | B1 | * | 11/2010 | Russell ........................... 248/55 |
| 2005/0218275 | A1 | * | 10/2005 | Keating ..................... 248/176.1 |
| 2008/0106018 | A1 | * | 5/2008 | Bellavance ..................... 269/57 |

\* cited by examiner

WORKPIECE SUPPORT ASSEMBLY

FIELD OF THE INVENTION

The present invention relates generally to workpiece supporting devices and more particularly, relating to a workpiece support assembly for a length of pipe or similar workpiece that includes adjustable workpiece supporting rollers.

BACKGROUND OF THE INVENTION

Workpiece supporting devices including pipe jacks or screw jacks used to support a length of pipe or similar workpiece as it is worked upon are known. While these devices heretofore fulfill their respective objectives and requirements, the need remains for a workpiece support device of an improved construction that is portable, easily operated and is capable of rotatably supporting workpieces of various diameters.

SUMMARY OF THE INVENTION

Embodiments of the present invention addresses this need by providing a workpiece support assembly including workpiece support roller assemblies of an improved construction that permits the positioning of the roller assemblies to support in rolling contact thereupon pipes of various diameters.

Embodiments of the present invention also provide workpiece support assembly that is selectively usable with a portable support stand or on a flat support surface.

To achieve these and other advantages, in general, in one aspect, workpiece support assembly includes a frame, a first roller assembly including a first swing arm and a first roller rotatably mounted to the first swing arm and a second roller assembly including a second swing arm and a second roller rotatably mounted to the second swing arm. Each of the first and the second swing arms are rotatably mounted to the frame forming a space between the first roller and the second roller for receiving the workpiece in rolling contact with the first roller and the second roller permitting the workpiece to be rotated about its axis while being supported on the first roller and the second roller. Each of the first and the second swing arms are rotatable to selectively position the first roller and the second roller towards or away from each other to either increase or decrease the space therebetween, thereby permitting workpieces of various diameters to be rotatably supported by the first roller and the second roller. A swing arm lock means retains the first and the second swing arms against rotation.

There has thus been outlined, rather broadly, the more important features of the invention in order that the detailed description thereof that follows may be better understood and in order that the present contribution to the art may be better appreciated.

Numerous objects, features and advantages of the present invention will be readily apparent to those of ordinary skill in the art upon a reading of the following detailed description of presently preferred, but nonetheless illustrative, embodiments of the present invention when taken in conjunction with the accompanying drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The following drawings illustrate by way of example and are included to provide further understanding of the invention for the purpose of illustrative discussion of the embodiments of the invention. No attempt is made to show structural details of the embodiments in more detail than is necessary for a fundamental understanding of the invention, the description taken with the drawings making apparent to those skilled in the art how the several forms of the invention may be embodied in practice. Identical reference numerals do not necessarily indicate an identical structure. Rather, the same reference numeral may be used to indicate a similar feature of a feature with similar functionality. In the drawings.

DETAILED DESCRIPTION OF THE INVENTION

Figure 1:
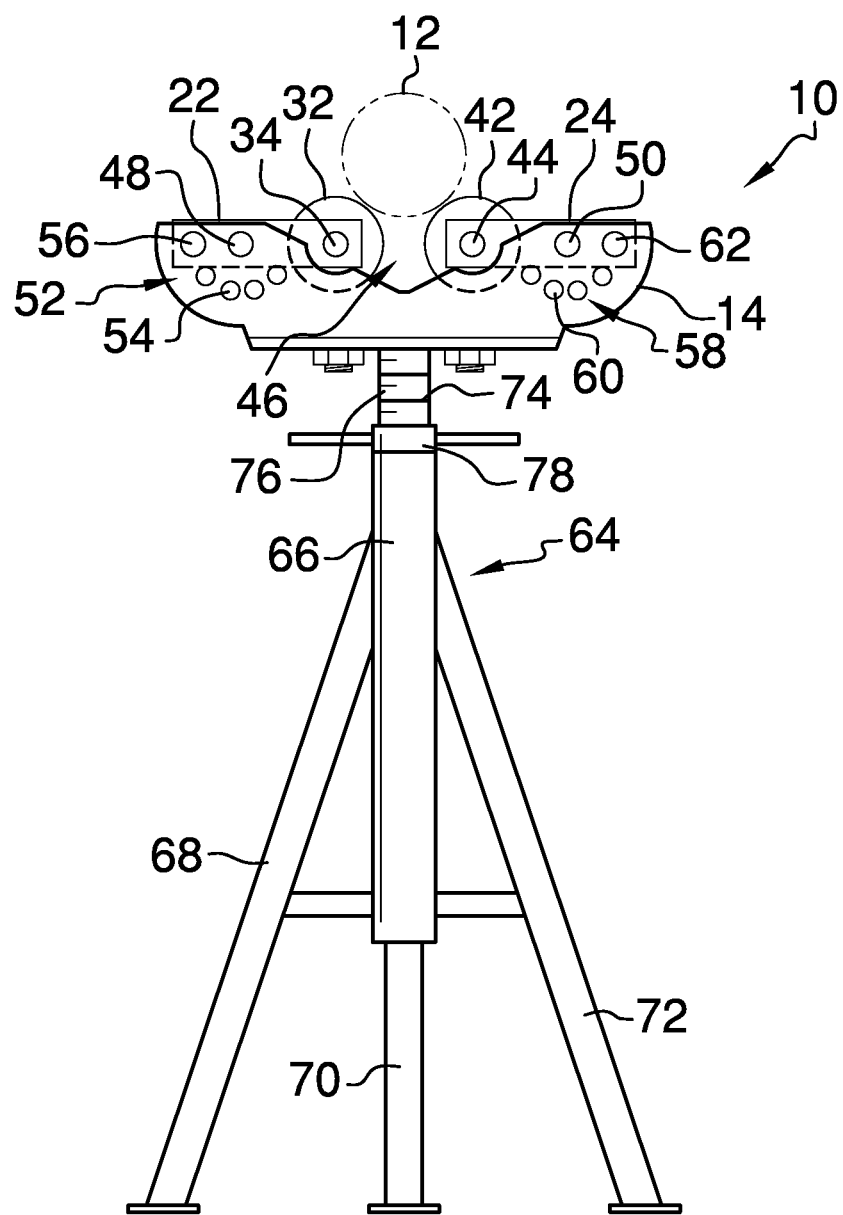
FIG. 1 is a front view of a workpiece support assembly in accordance with the principles of the present invention.
Figure 2:
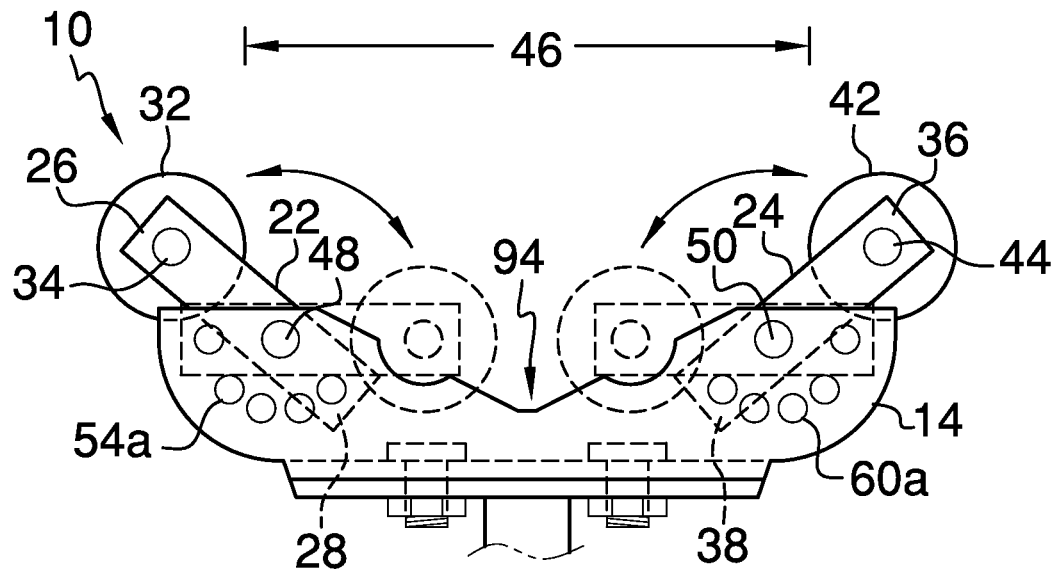
FIG. 2 is an enlarged partial front view of the workpiece support assembly of FIG. 1.
Figure 3:
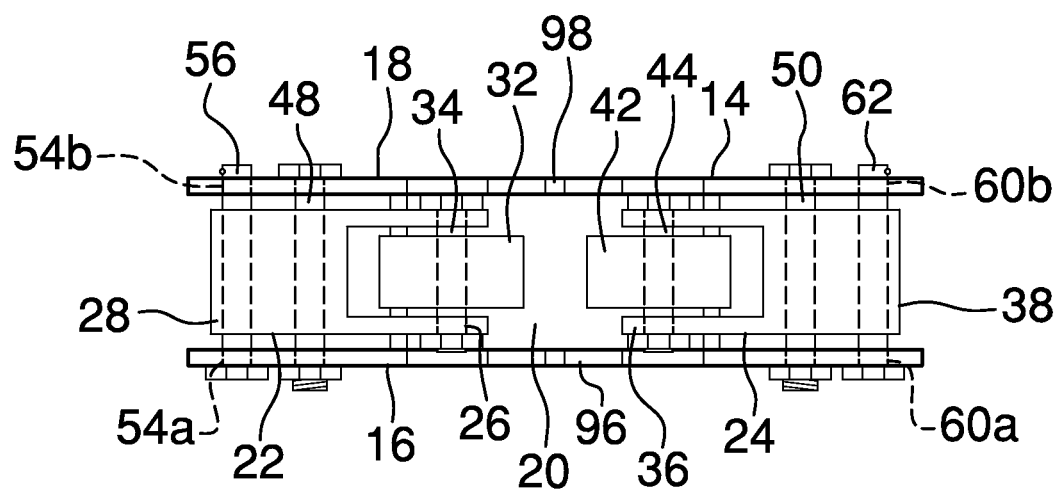
FIG. 3 is an enlarged top view of the workpiece support assembly of FIG. 1.
Figure 4:
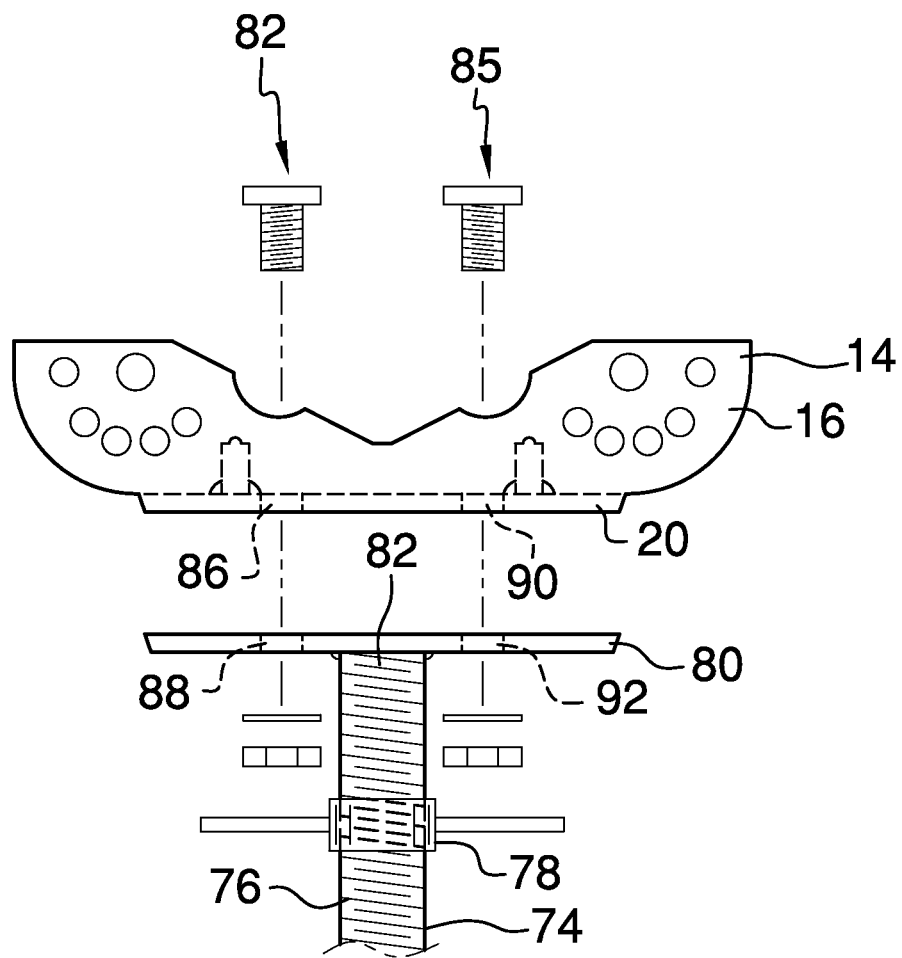
FIG. 4 is an enlarged exploded partial front view of the workpiece support assembly of FIG. 1.

Referring now to FIGS. 1 through 4, there is shown a workpiece support embodying the principles of the invention and generally designated by reference number 10. Workpiece support 10 is used as a temporary support for a length of pipe 12 or similar workpiece while it is being worked upon.

Workpiece support 10 includes a frame 14 having vertically oriented plate members 16 and 18 and a bottom member 20 that is attached to and extends between plate members 16 and 18. Workpiece support 10 further includes a first swing arm 22 and a second swing arm 24. The first swing arm 22 has a first end 26, an opposed second end 28 and length 30 extending therebetween. A first roller 32 is rotatably mounted to the first end 26 of the first swing arm 22 by axel 34. Likewise, the second swing arm 24 has a first end 36, an opposed second end 38 and a length 40 extending therebetween. A second roller 42 is rotatably mounted to the first end 36 of the second swing arm 24 by axel 44.

The first and the second swing arms 22 and 24 are disposed between plate members 16 and 18 such that a space 46 is provided between the first roller 32 and the second roller 42 for receiving the workpiece 12 in rolling contact with the first roller and the second roller, thereby permitting the workpiece to be rotated about its long axis while being supported on the first roller and the second roller. The first and the second swing arms 22 and 24 rotatably mounted to the frame 14 to selectively position the first roller 32 and the second roller 42 towards or away from each other to either increase or decrease the space 46 therebetween, thereby permitting workpieces of various diameters to be rotatingly supported by the first roller and the second roller. The first swing arm 22 is rotatably mounted to the frame 14 by a pin member 48 which is mounted to and extends between plate members 16 and 18 at a position intermediate the first end 26 and the second end 28 of the first swing arm. Likewise, the second swing arm 24 is rotatably mounted to the frame 14 by a pin member 50 which is mounted to and extends between plate members 16 and 18 at a position intermediate the first end 36 and the second end 38 of the second swing arm.

The first swing arm 22 is restrained against rotating by a lock 52. Lock 52 includes a plurality of pairs of cooperatively aligned apertures 54a, 54b formed through the first plate member 16 and the second plate member 18. Apertures 54a, 54b are arranged in a circular array about axel 34. Lock 52 further includes a retaining pin 56 this is selectively disposed through a pair of apertures 54a, 54b and through the first swing arm 22. Likewise, the second swing arm 24 is restrained against rotating by a similar lock 58. Lock 58 includes a plurality of pairs of cooperatively aligned apertures 60a, 60b formed through the first plate member 16 and the second plate member 18. Apertures 60a, 60b are arranged in a circular array about axel 44. Lock 58 further includes a retaining pin 62 this is selectively disposed through a pair of apertures 60a, 60b and through the first swing arm 24.

The workpiece support 10 further includes a height adjustable screw jack stand 64. Stand 64 has a support tube 66 of a generally cylindrical configuration. Three support legs 68-72 extend from the support tube 66 for supporting the support tube in a generally vertical orientation on a support surface. An elevating member 74 is telescopically received by the support tube 66 and includes a threaded portion 76 to which a wing nut 78 is threaded. A mounting plate 80 is attached to an upper end 82 of the elevating member 74. The frame 14 is detachably secured to the mounting plate 80 by bolt assemblies 82 and 85 which extend aligned openings 86,88 and 90,92, respectively, through the bottom member 20 of the frame and the mounting plate. The height of the frame 14 is adjusted by threading wing nut 78 towards or away from end 82 of the elevating member 74.

In use, the frame 12 may be attached to the stand 64 or used separately therefrom by resting the bottom of the frame on a flat support surface. The space 46 between the first and second rollers 32 and 42 is adjusted to the diameter of the workpiece 12 by rotating the first and second swing arms 22 and 24. Locks 52 and 58 are operated to lock the positioning of the first and second rollers 32 and 42. The work piece 12 is then placed upon the rollers 32 and 42, where it is then supported for rotation about the long axis of the workpiece while being worked upon.

In embodiments, the workpiece support 10 includes a V-shaped saddle 94 defined by aligned notches 96 and 98 formed in plate members 16 and 18, respectively. The workpiece 12 may be disposed within and supported by the V-shaped saddle 94 as opposed to being supported by rollers 32 and 42 so as to support the workpiece in a non-rotatable manner.

A number of embodiments of the present invention have been described. Nevertheless, it will be understood that various modifications may be made without departing from the spirit and scope of the invention. Accordingly, other embodiments are within the scope of the following claims.

What is claimed is:

1. A workpiece support assembly for rotatably supporting an elongated cylindrical article for rotation about a long axis of the article, the workpiece support assembly comprising:

a single frame member having a pair of vertical plate members;

a first roller assembly including a first swing arm and a first roller rotatably mounted to said first swing arm, said first swing arm mounted to said frame between said pair of vertical plate members upon a first axel connected to and extending between said pair of vertical plate members;

a first plurality of pairs of cooperatively aligned apertures formed through said pair of vertical plate members in a circular array about said first axel;

a first retaining pin selectively received by a single pair of said first plurality of pairs of cooperatively aligned apertures and said first swing arm so as to lock its rotational position about said first axel and relative to said frame;

a second roller assembly including a second swing arm and a second roller rotatably mounted to said second swing arm, said second swing arm mounted to said frame between said pair of vertical plate members upon a second axel connected to and extending between said pair of vertical plate members;

a second plurality of pairs of cooperatively aligned apertures formed through said pair of vertical plate members in a circular array about said second axel;

a second retaining pin selectively received by a single pair of said second plurality of pairs of cooperatively aligned apertures and said second swing arm so as to lock its rotational position about said second axel and relative to said frame;

said first roller and said second roller defining a space therebetween for receiving the workpiece in rolling contact with said first roller and said second roller permitting the workpiece to be rotated about its long axis while being supported on said first roller and said second roller; and wherein each of said first and said second rollers is selectively positioned towards or away from each other to either increase or decrease said space between said first and said second rollers, thereby permitting workpieces of various diameters to be rotatingly supported by said first roller and said second roller.

2. The workpiece support assembly of claim 1, wherein said first roller and said second roller are rotatable about first parallel axes, and wherein said first swing arm and said second swing arm are rotatable about second parallel axes that is parallel to said first parallel axes.

3. The workpiece support assembly of claim 1, wherein said frame has a substantially flat bottom that permits the placement of said frame on a horizontal supporting surface.

4. The workpiece support assembly of claim 1, further comprising:

a stand having a lower member having mounted thereto a plurality of support legs and an elevating member telescopic relative to said lower member; and wherein said frame is releasably mounted to said elevating member.

5. The workpiece support assembly of claim 1, wherein each of said vertical plate members include a V-shaped saddle for receiving the workpiece and supporting the workpiece in a non-rotating contact with said first roller and said second roller.

* * * * *